(12) United States Patent
Sakiyama et al.

(10) Patent No.: US 10,677,051 B2
(45) Date of Patent: Jun. 9, 2020

(54) METHODS AND APPARATUS TO CHARACTERIZE ACOUSTIC DISPERSIONS IN A BOREHOLE

(71) Applicant: Schlumberger Technology Corporation, Sugar Land, TX (US)

(72) Inventors: Naoki Sakiyama, Tokyo (JP); Hiroaki Yamamoto, Kanagawa-Ken (JP); Takeshi Endo, Kanagawa-Ken (JP); Denis Syresin, Kanagawa-Ken (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/838,920

(22) Filed: Dec. 12, 2017

(65) Prior Publication Data

US 2019/0178078 A1  Jun. 13, 2019

(51) Int. Cl.
*E21B 47/18* (2012.01)
*E21B 47/10* (2012.01)
*G01V 1/50* (2006.01)

(52) U.S. Cl.
CPC ............ *E21B 47/18* (2013.01); *E21B 47/101* (2013.01); *G01V 1/50* (2013.01); *G01V 2200/16* (2013.01); *G01V 2210/582* (2013.01)

(58) Field of Classification Search
CPC ...................................................... E21B 47/18
See application file for complete search history.

(56) References Cited

U.S. PATENT DOCUMENTS

| | | | |
|---|---|---|---|
| 7,894,300 B2* | 2/2011 | Hawthorn | G01V 1/50 367/73 |
| 8,638,639 B2* | 1/2014 | Bratton | G01V 1/50 367/35 |
| 9,933,538 B2* | 4/2018 | Lim | G01V 1/46 |
| 2006/0235617 A1 | 10/2006 | Sinha et al. | |
| 2008/0027650 A1* | 1/2008 | Huang | G01V 1/48 702/13 |
| 2008/0175099 A1* | 7/2008 | Hawthorn | G01V 1/50 367/25 |
| 2015/0036460 A1 | 2/2015 | Kinoshita et al. | |

OTHER PUBLICATIONS

Scheibner et al., Slow Formation Shear from an LWD Tool: Quadrupole Inversion with a Gulf of Mexico Example. SPWLA 51st Annual Logging Symposium, Perth, Australia. Jun. 19-23, 2010. 14 pages.

\* cited by examiner

*Primary Examiner* — Nader Bolourchi

(57) ABSTRACT

Methods, apparatus, and articles of manufacture are disclosed to characterize acoustic dispersions in a borehole. An example apparatus includes a dispersion analyzer to characterize an acoustic wave dispersion in a borehole in a formation by calculating a quality indicator corresponding to the acoustic wave dispersion, and a report generator to prepare a report including a recommendation to perform an operation on the borehole based on the quality indicator.

26 Claims, 9 Drawing Sheets

METHODS AND APPARATUS TO CHARACTERIZE ACOUSTIC DISPERSIONS IN A BOREHOLE

FIELD OF THE DISCLOSURE

This disclosure relates generally to acoustic measurement and, more particularly, to methods and apparatus to characterize acoustic dispersions in a borehole.

BACKGROUND

The oil and gas industry uses various tools to probe a formation penetrated by a borehole to determine types and quantities of hydrocarbons in a hydrocarbon reservoir. Among these tools, acoustic logging tools have been used to provide valuable information regarding formation properties. Typically, in acoustic logging, a tool is lowered into a borehole and acoustic energy in the form of acoustic waves is transmitted from a source into the borehole and surrounding formation. The acoustic waves that travel through the borehole and formation are detected with one or more receivers.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
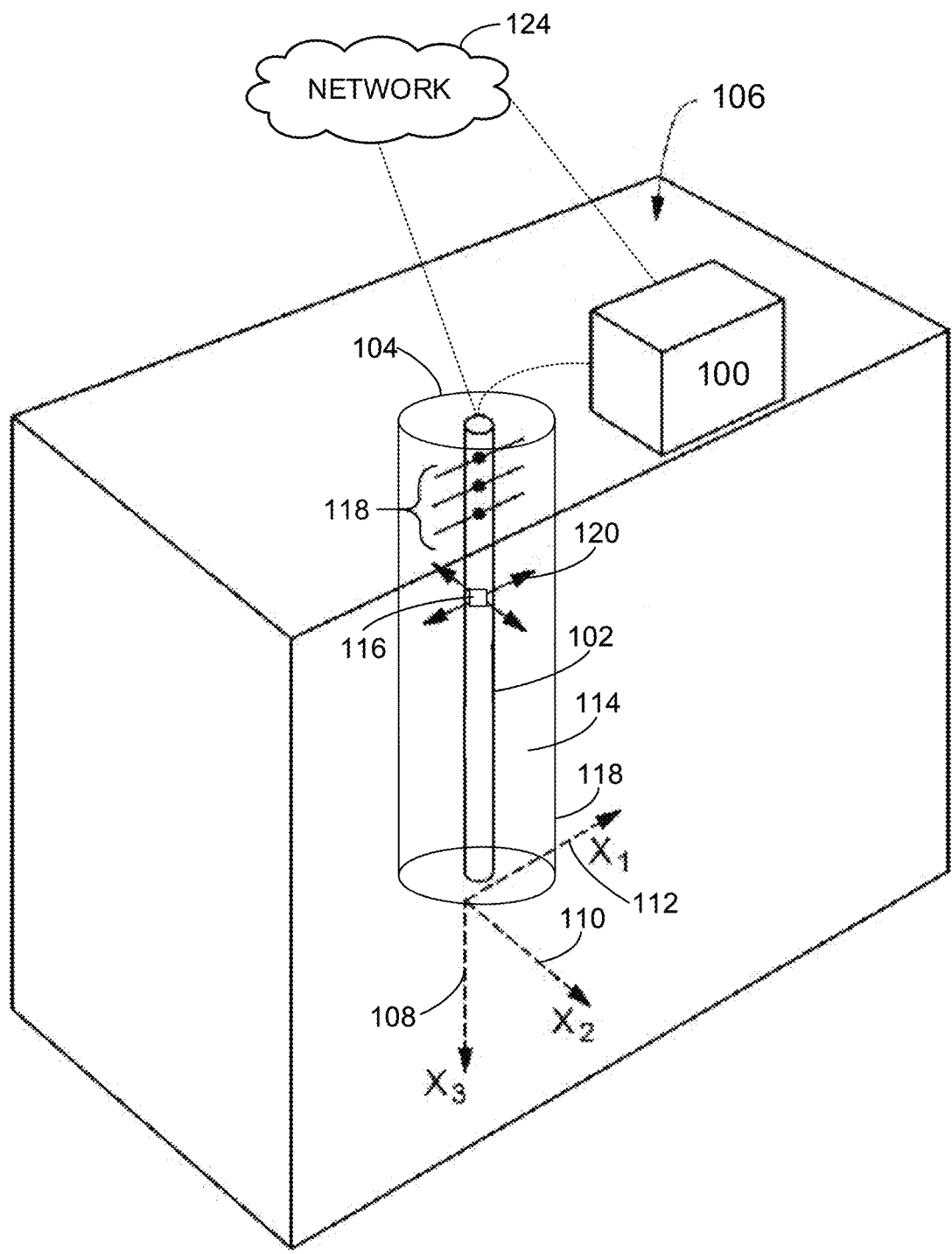
FIG. 1 is a schematic illustration depicting an example dispersion quality manager apparatus measuring acoustic waves in a borehole in a formation.

Methods, apparatus, and articles of manufacture to characterize acoustic dispersions in a borehole are disclosed. An example apparatus includes a dispersion analyzer to characterize an acoustic wave dispersion in a borehole in a formation by calculating a quality indicator corresponding to the acoustic wave dispersion, and a report generator to prepare a report including a recommendation to perform an operation on the borehole based on the quality indicator.

An example method includes characterizing an acoustic wave dispersion in a borehole in a formation by calculating a quality indicator corresponding to the acoustic wave dispersion, and preparing a report including a recommendation to perform an operation on the borehole based on the quality indicator.

An example non-transitory computer readable storage medium comprising instructions which, when executed, cause a machine to at least characterize an acoustic wave dispersion in a borehole in a formation by calculating a quality indicator corresponding to the acoustic wave dispersion, and prepare a report including a recommendation to perform an operation on the borehole based on the quality indicator.

The oil and gas industry uses tools such as Logging While Drilling (LWD) sonic logging tools and wireline sonic logging tools to transmit acoustic waves into a borehole. Sonic logging tools or acoustic logging tools have been used to provide valuable information regarding formation properties. Typically, in acoustic logging, a tool is lowered into a borehole and a source included in the tool transmits energy in the form of acoustic waves into the borehole and surrounding formation. The acoustic waves that travel through the borehole and formation are detected with one or more receivers included in the acoustic logging tools. Acoustic waves are periodic vibrational disturbances resulting from acoustic energy that propagate through a medium, such as a subsurface formation. Acoustic waves are typically characterized in terms of frequency f (e.g., $f=V/\lambda$, where V is the speed of sound and $\lambda$ is the wavelength), amplitude, and speed of propagation (e.g., Velocity, V).

An acoustic source in a fluid-filled borehole generates headwaves as well as relatively stronger borehole-guided modes. A standard sonic measurement system consists of placing a source (e.g., an acoustic source, a sonic source, etc.) and one or more receivers (e.g., an acoustic receiver, a sonic receiver, etc.) inside a fluid-filled borehole. The source is configured in the form of either a monopole, or a dipole, or a quadrupole source. The source bandwidth typically ranges from 0.5 to 20 kHz. A monopole source generates primarily the lowest-order axisymmetric mode, also referred to as the Stoneley mode, together with compressional and shear headwaves. In contrast, a dipole source primarily excites the lowest-order flexural borehole mode together with compressional and shear headwaves. A quadrupole source primarily excites the lowest order quadrupole mode together with compressional and shear headwaves.

A Stoneley wave or an acoustic wave in a Stoneley mode is a type of large-amplitude interface, or surface, wave generated by a sonic tool in a borehole. Stoneley waves can propagate along a solid-fluid interface, such as along the walls of a fluid-filled borehole and are the main low-frequency component of signals generated by sonic sources in boreholes. In some examples, an analysis of Stoneley waves can allow estimation of the locations of fractures and permeability of the formation. In some examples, Stoneley waves are a major source of noise in vertical seismic profiles.

Recordings of acoustic properties as functions of depth are known as acoustic logs. Information obtained from acoustic logs may be useful in a variety of applications, including well-to-well correlation, porosity determination, and determination of mechanical or elastic rock parameters. For example, the determination of mechanical or elastic rock parameters based on an acoustic log may give an indication of lithology, detection of over-pressured formation zones, and/or the conversion of seismic time traces to depth traces based on the measured speed of sound in the formation. For example, the permeability of the formation around the wellbore may be extracted by analysis of the Stoneley wave characteristics such as an amplitude, slowness, and attenuation of the Stoneley waves.

Slowness-Frequency Analysis (SFA) is widely used as a visual quality control (QC) method for post-processing of recorded LWD sonic logging data, well-site processing for wireline sonic logging data, etc. SFA techniques include evaluating slowness of an acoustic wave, which is determined by calculating a reciprocal of a velocity of the acoustic wave. The velocity of an acoustic wave in a medium depends upon elastic properties of the medium. For example, a square of the velocity of an acoustic wave in a formation is directly proportional to the elastic modulus of material in the formation and inversely proportional to a density of the material. In such an example, a square of the slowness of the acoustic wave in the formation is inversely proportional to the elastic modulus of the material and directly proportional to the density of the material. For example, an acoustic wave traveling through damaged rock near the wellbore may correspond to an increase in slowness values compared to the acoustic wave traveling in a far-field area of the formation. In another example, an acoustic wave traveling through relatively undamaged and/or unperturbed rock near the wellbore may correspond to a decrease or a lack of change in slowness values compared to the acoustic wave traveling in a far-field area of the formation.

According to conventional SFA techniques, dispersions are first calculated or extracted from measured waveforms using an algorithm such as a modified matrix pencil algorithm. However, typical SFA analysis lacks techniques to evaluate a quality of dispersive/non-dispersive waveforms in a quantitative manner. For example, prior examples determine QC parameters of characteristics of a dispersion curve but do not directly characterize a quality of the dispersion curve. As used herein, the term "dispersion curve" refers to a graphical representation of a slowness of a wave (e.g., an acoustic wave, a sonic wave, etc.) as a function of frequency. Further, prior examples do not evaluate a continuity (e.g., a smoothness) of a dispersion to determine the quality of the dispersion curve. In some examples, the quality of the dispersion curve corresponds to a reliability of the acoustic logging data. In some examples, the quality of the dispersion curve corresponds to a mechanical indicator of the borehole and/or the formation such as a measure of near-wellbore stiffness, a measure of near-wellbore softening, etc.

Examples disclosed herein include a dispersion quality manager (DQM) apparatus to characterize acoustic dispersions in a borehole. In some examples, the DQM apparatus analyzes dispersion data in a frequency domain calculated from time-domain waveforms. As used herein, the term "dispersion data" refers to data corresponding to a dispersion of an acoustic wave including velocity data (e.g., phase velocity data) as a function of frequency. In some examples, the DQM apparatus determines the dispersion data by obtaining acoustic data using an acoustic logging tool in a borehole in a formation (e.g., a sub-surface formation) and calculating slowness information as a function of frequency based on the acoustic data.

In some examples, the DQM apparatus calculates a quality indicator (e.g., a dispersion quality indicator (DQI)) of an acoustic dispersion based on data included in an inverse of a slowness variation width (e.g., an inverse of a slowness variation width data), frequency continuity data, etc., and/or a combination thereof. As used herein, the term "frequency continuity" refers to a frequency band (e.g., a range of frequencies) where slowness dispersion data as a function of frequency is continuous. For example, frequency continuity may correspond to a frequency band including frequency points where a slowness difference between two neighboring frequency points is less than a threshold value (e.g., 10 microseconds/foot, 15 microseconds/foot, 20 microseconds/foot, etc.). In another example, frequency continuity may correspond to a frequency band where a sign (e.g., a mathematical sign) of the slowness-frequency dispersion gradient as a function of frequency does not change. In such an example, a point at which where the sign changes may correspond to a discontinuous point. For example, a slowness-frequency dispersion curve that does not include a discontinuous point may be regarded as a continuous curve.

In some examples, the DQM apparatus calculates the inverse of the slowness variation width based on projecting the dispersion data onto a slowness axis and performing a mathematical operation (e.g., an inversion operation) on the projected dispersion data by inverting the projected slowness data. In some examples, the DQM apparatus calculates frequency continuity data by evaluating the slowness data continuity along a frequency axis. In some examples, the DQM apparatus calculates the DQI for the dispersion data at a borehole depth based on performing a mathematical operation such as multiplying a scaled inverse of the slowness variation width data point at the borehole depth and a scaled frequency continuity data point at the borehole depth. In some examples, the DQM apparatus characterizes the acoustic dispersion at the borehole depth to determine a reliability of the acoustic data, to determine whether to perform an oil-well completion operation on the borehole, etc., based on the DQI.

In some examples, the DQM apparatus characterizes an acoustic dispersion in a borehole in a formation based on the DQI. For example, the DQM apparatus may characterize an acoustic dispersion having a DQI value in a range of 0.0 to 1.0, where a DQI value of 0.0 may correspond to a low-quality or a poor acoustic dispersion and a DQI value of 1.0 may correspond to a high-quality or a clean acoustic dispersion. In some examples, a DQI value corresponding to a low-quality dispersion includes first slowness data having a wider range of slowness values within a frequency band compared to a DQI value corresponding to a high-quality dispersion that includes second slowness data having a narrower range of slowness values within the frequency band. For example, a low-quality acoustic dispersion may correspond to damaged rock near the wellbore causing an increase in slowness values as a function in frequency and/or a greater variation in slowness values over a frequency band.

In some examples, a DQI value corresponding to a low-quality dispersion includes first slowness-frequency data being continuous for a shorter frequency band compared to a DQI value corresponding to a high-quality dispersion that includes second slowness-frequency data being continuous for a longer frequency band. For example, a low-quality acoustic dispersion may correspond to damaged rock near the wellbore causing a discontinuous dispersion of acoustic waves and, thus, resulting in a shorter frequency band of continuous part of the frequency-slowness data recorded by the acoustic logging tool.

FIG. 1 is a schematic illustration depicting an example dispersion quality manager (DQM) 100 communicatively coupled to an example logging tool 102 (e.g., an acoustic logging tool, a sonic tool, a wireline logging tool, etc.) operating in a borehole 104 (e.g., a wellbore) in a formation 106. The formation 106 of the illustrated example can contain a desirable fluid such as oil or gas. In the illustrated example, the borehole 104 is a vertical wellbore (e.g., parallel to an X3-axis 108) drilled in the formation 106. Although the borehole 104 is depicted as a vertical wellbore in FIG. 1, alternatively, the borehole 104 may be a deviated wellbore (e.g., parallel to an X2-axis 110) or a horizontal wellbore (e.g., parallel to an X1-axis 112). The example borehole 104 may be used to extract the desirable fluid. Alternatively, the example borehole 104 may be a fluid-filled wellbore filled with a borehole fluid 114 such as a drilling fluid.

In the illustrated example of FIG. 1, the logging tool 102 is disposed in the borehole 104. The logging tool 102 of the illustrated example is an LWD tool. Alternatively, the example logging tool 102 may be any other type of logging tool or sonic tool such as a measurement while drilling (MWD) tool, a wireline logging tool, etc.

In the illustrated example of FIG. 1, the logging tool 102 includes at least one acoustic source 116 and an array of acoustic receivers 118 (e.g., an acoustic array). The acoustic source 116 of the illustrated example can be configured to excite monopole, dipole, or other multipole acoustic modes (e.g., a quadrupole acoustic mode). By arranging the acoustic receivers 118 in an array with different spacing from the acoustic source 116, the logging tool 102 can improve signal quality and extract various borehole signals over a broad frequency band. The acoustic source 116 of the illustrated example is configured to transmit energy (e.g., broadband energy) in a form of acoustic waves 120 into the formation 106.

In the illustrated example of FIG. 1, the acoustic waves 120 can be characterized by frequency and wavelength. In some examples, the acoustic source 116 transmits the broadband energy 120 at frequencies in a range of 0.5 to 20 kHz. Alternatively, the example acoustic source 116 may transmit the broadband energy 120 at frequencies in any other range. In some examples, the transmitted energy 120 excites compressional, shear, Stoneley, flexural and/or multipole waves in the formation 106. In the illustrated example, the array of acoustic receivers 118 is configured to detect the compressional, shear, Stoneley, flexural or multipole waves travelling in the drilling fluid 114. In some examples, the energy 120 transmitted by the acoustic source 116 can be reflected and/or refracted from a fluid-formation interface 122 (e.g., an interface between the borehole 104 and the formation 106).

In the illustrated example of FIG. 1, the logging tool 102 is communicatively coupled with the DQM 100. The DQM 100 of the illustrated example is located above or on the surface of the formation 106. Additionally or alternatively, the example DQM 100 may be included in the logging tool 102. In some examples, the DQM 100 obtains information from the logging tool 102. For example, the DQM 100 may obtain acoustic information such as frequency data, velocity data, etc., corresponding to an acoustic wave. In another example, the DQM 100 may obtain time-interval data corresponding to a time difference between a transmission of an acoustic wave from the acoustic source 116 and a reception of the acoustic wave at the array of receivers 118.

In the illustrated example of FIG. 1, the logging tool 102 is communicatively coupled to a network 124. The example network 124 of the illustrated example of FIG. 1 is the Internet. However, the example network 124 may be implemented using any suitable wired and/or wireless network(s) including, for example, one or more data buses, one or more Local Area Networks (LANs), one or more wireless LANs, one or more cellular networks, one or more private networks, one or more public networks, etc. In some examples, the network 124 enables the example DQM 100 to be in communication with the example logging tool 102. For example, the DQM 100 may obtain information (e.g., acoustic information, sonic information, etc.) from the logging tool 102 via the network 124.

In some examples, the network 124 enables the logging tool 102 to communicate with an external computing device (e.g., a database, a server, etc.) to store the information obtained by the logging tool 102. In such examples, the network 124 enables the DQM 100 to retrieve and/or otherwise obtain the stored information for processing. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

In some examples, the DQM 100 calculates a dispersion quality indicator (DQI) corresponding to obtained information from the logging tool 102. For example, the DQM 100 may characterize an acoustic dispersion of the acoustic waves 120 in the borehole 104 and/or the formation 106. For example, the DQM 100 may calculate a DQI value in a range of 0.0 to 1.0 corresponding to an acoustic dispersion at a specified depth of the formation 106. Alternatively, the DQM 100 may calculate a DQI value in another other range. For example, DQI values approaching 0.0 for a depth of a formation 106 may represent a near-wellbore softening condition (e.g., mechanically damaged rock which may fail in later borehole completion operations). In another example, DQI values approaching 1.0 for a depth of the formation 106 may represent a mechanically stiff wellbore condition (e.g., the formation 106 at the measured depth does not exhibit a near-wellbore softening condition).

In some examples, the DQM 100 generates a recommendation based on the DQI. For example, the DQM 100 may generate recommendation to perform an operation (e.g., a wellbore operation) on the borehole based on the DQI. For example, the recommendation may be a wellbore operation recommendation, proposal, plan, strategy, etc. An example wellbore operation may include performing a cementing operation, a coiled-tubing operation, a hydraulic fracturing operation, deploying, installing, or setting a packer (e.g., a compression-set packer, a production packer, a sealbore packer, etc.), etc., and/or a combination thereof.

In some examples, the DQM 100 generates a recommendation including a proposal to initiate, perform, proceed, pursue, etc., one or more wellbore operations. For example, the DQM 100 may generate a recommendation including a proposal to perform a wellbore operation such as installing a packer based on the DQI. For example, the DQM 100 may generate a recommendation including a proposal to perform a wellbore operation in response to the DQM 100 characterizing the formation 106 at one or more specified depths as exhibiting a mechanically stiff wellbore condition.

In some examples, the DQM 100 generates a recommendation including a proposal to abort one or more wellbore operations. For example, the DQM 100 may generate a recommendation including a proposal to abort a performance of a wellbore operation such as a hydraulic fracturing operation based on the DQI. For example, the DQM 100 may generate a recommendation including a proposal to abort a forecasted wellbore operation in response to the DQM 100 characterizing the formation 106 at one or more specified depths as exhibiting a near-wellbore softening condition.

Figure 2A:
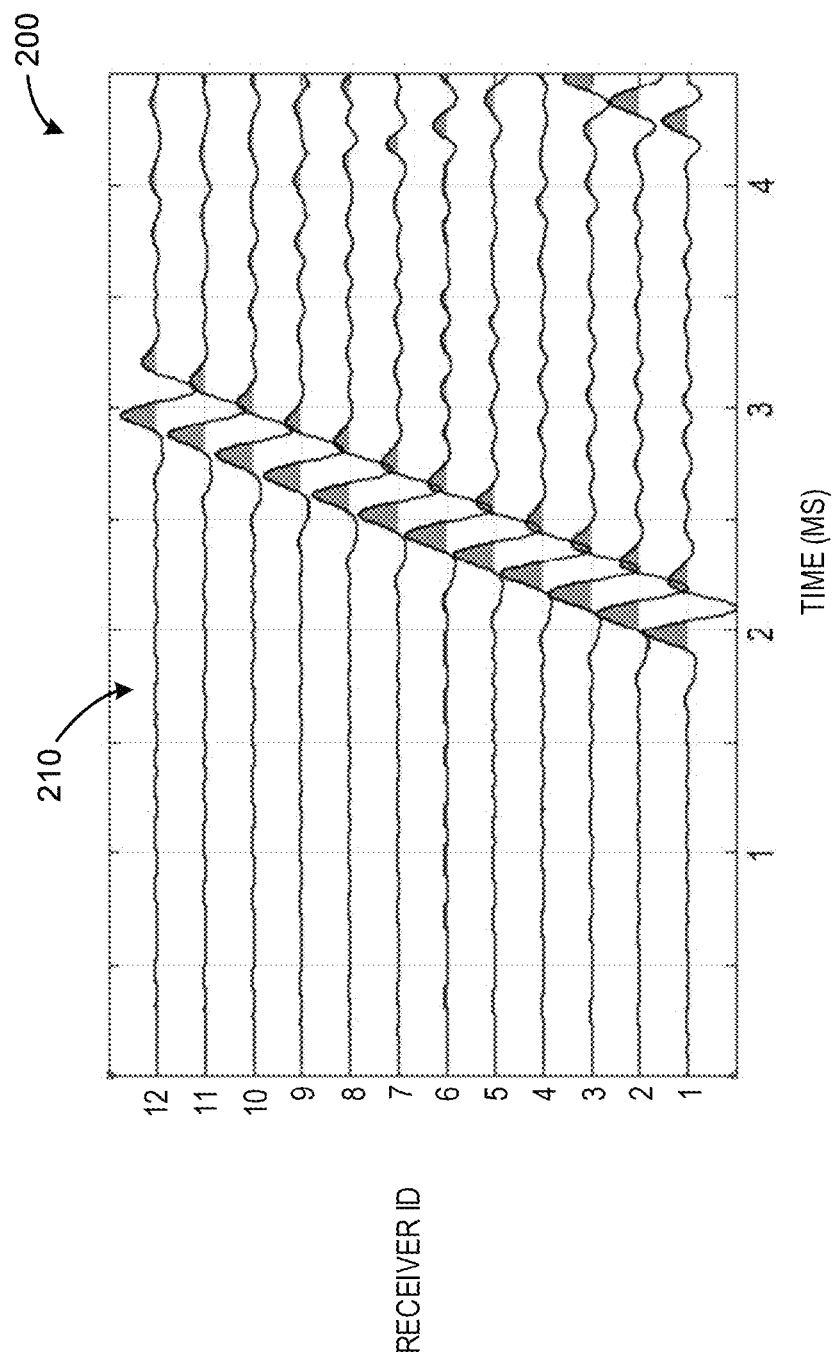
FIG. 2A is an example graph illustrating example acoustic waveforms measured by an acoustic array.

FIG. 2A is an example graph 200 illustrating example acoustic waveforms 210 measured by an example acoustic array of an example acoustic logging tool. For example, the acoustic array 118 of the logging tool 102 of FIG. 1 may measure the acoustic waveforms 210 of FIG. 2A. In the illustrated example of FIG. 2A, an acoustic wave transmitted by an acoustic source of an acoustic logging tool is received by the acoustic array including twelve acoustic receivers (identified by receiver ID 1-12). In the illustrated example of FIG. 2A, the acoustic waveforms 210 correspond to Stoneley mode and are measured in the time domain. Additionally or alternatively, the example acoustic array may measure acoustic waveforms in any other mode.

Figure 2B:
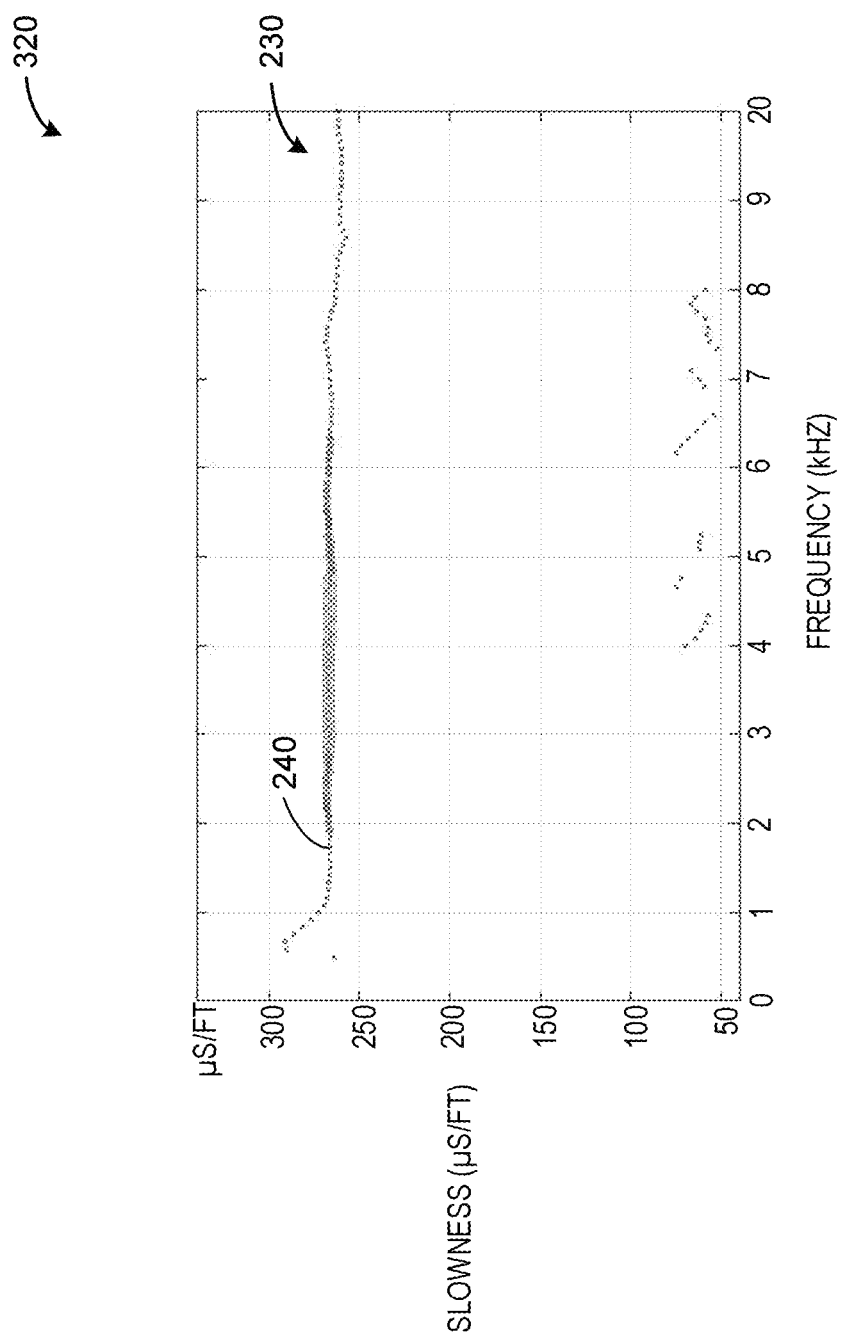
FIG. 2B is an example graph illustrating example slowness-frequency dispersions extracted from the example acoustic waveforms of FIG. 2A.

FIG. 2B is an example graph 220 illustrating example slowness-frequency dispersions 230 extracted from the example acoustic waveforms 210 of FIG. 2A. For example, the DQM 100 may convert the acoustic waveforms 210 of FIG. 2A in the time domain into the slowness-frequency dispersions 230 in the frequency domain. In the illustrated example of FIG. 2B, the slowness-frequency dispersions 230 can be extracted by applying a modified matrix-pencil algorithm on the acoustic waveforms 210 of FIG. 2A. For example, the low frequency asymptote of the first order mode 240 may be sensitive to shear slowness of formation as well as the slowness of the borehole fluid 114 of FIG. 1.

Figure 3:
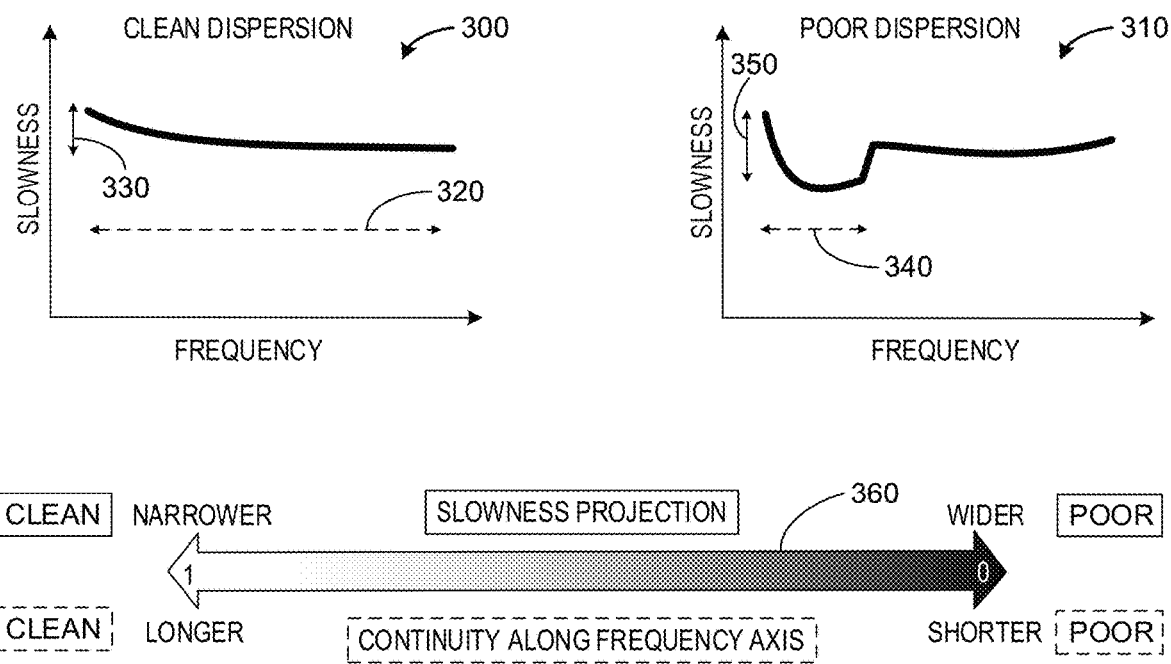
FIG. 3 is a schematic illustration depicting example characterizations of a first example slowness-frequency dispersion and a second example slowness-frequency dispersion.

FIG. 3 is a schematic illustration depicting example characterizations of a first example slowness-frequency dispersion 300 and a second example slowness-frequency dispersion 310. For example, the DQM 100 may identify the first slowness-frequency dispersion 300 as a clean acoustic dispersion or a high-quality acoustic dispersion. In another example, the DQM 100 may identify the second slowness-frequency dispersion 310 as a poor acoustic dispersion or a low-quality acoustic dispersion. In the illustrated example of FIG. 3, the first and the second example slowness-frequency dispersions 300, 310 correspond to acoustic waves in the Stoneley mode. Alternatively, the example DQM 100 may characterize acoustic dispersions in any other mode.

In the illustrated example of FIG. 3, the first example slowness-frequency dispersion 300 represents a clean dispersion corresponding to a slowness of an acoustic wave as a function of frequency of the acoustic wave. For example, the first slowness-frequency dispersion 300 may correspond to an acoustic dispersion of the acoustic waves 120 of FIG. 1. In the illustrated example of FIG. 3, the DQM 100 characterizes the first slowness-frequency dispersion 300 as a clean dispersion based on frequency continuity and slowness projection. For example, the DQM 100 may determine that the first slowness-frequency dispersion 300 is continuous over a significant portion of a specified frequency range based on evaluating a first frequency continuity band 320 (indicated by two-sided arrow connected by dashed lines). In another example, the DQM 100 may determine that the first slowness-frequency dispersion 300 includes a narrow slowness projection based on evaluating a first slowness projection band 330 (indicated by two-sided arrow connected by solid line). For example, the first slowness projection band 330 may be narrow due to decreased scattering and/or a distortion of the dispersion of the acoustic waves 120 in the formation 106 of FIG. 1.

In the illustrated example of FIG. 3, the second example slowness-frequency dispersion 310 represents a poor dispersion corresponding to a slowness of an acoustic wave as a function of frequency of the acoustic wave. For example, the second slowness-frequency dispersion 310 may correspond to an acoustic dispersion of the acoustic waves 120 of FIG. 1. In the illustrated example of FIG. 3, the DQM 100 characterizes the second slowness-frequency dispersion 310 as a poor dispersion based on the frequency continuity and the slowness projection. For example, the DQM 100 may determine that the second slowness-frequency dispersion 310 is continuous over a smaller portion of the specified frequency range compared to the first slowness-frequency dispersion 300 based on evaluating a second frequency continuity band 340 (indicated by two-sided arrow connected by dashed lines). In another example, the DQM 100 may determine that the second slowness-frequency dispersion 310 includes a wide slowness projection based on evaluating a second slowness projection band 350 (indicated by two-sided arrow connected by solid line). For example, the second slowness projection band 340 may be wider compared to the first slowness projection band 330 due to increased scattering and/or a distortion of the dispersion of the acoustic waves 120 in the formation 106 of FIG. 1.

In the illustrated example of FIG. 3, a dispersion evaluation benchmark 360 is depicted. In some examples, the DQM 100 characterizes an acoustic dispersion based on the continuity along the frequency axis using the dispersion evaluation benchmark 360. For example, the DQM 100 may compare the first and the second frequency continuity bands 320, 340 to the dispersion evaluation benchmark 360. In such an example, the DQM 100 may identify that the first frequency continuity band 320 approaches the longer end of the spectrum corresponding to the continuity along the frequency axis component of the dispersion evaluation benchmark 360. Similarly, the DQM 100 may identify that the second frequency continuity band 340 approaches the shorter end of the spectrum corresponding to the continuity along the frequency axis component of the dispersion evaluation benchmark 360.

In some examples, the DQM 100 characterizes an acoustic dispersion based on the slowness projection using the dispersion evaluation benchmark 360. For example, the slowness projection may correspond to a rate of change of the slowness of an acoustic dispersion as a function of the frequency of the acoustic dispersion. For example, the DQM 100 may compare the first and the second slowness projection bands 330, 350 to the dispersion evaluation benchmark 360. In such an example, the DQM 100 may identify that the first slowness projection band 330 approaches the narrower end of the spectrum corresponding to the slowness projection component of the dispersion evaluation benchmark 360. Similarly, the DQM 100 may identify that the second slowness projection band 350 approaches the wider end of the spectrum corresponding to the slowness projection component of the dispersion evaluation benchmark 360.

In some examples, the DQM 100 identifies an acoustic dispersion as a clean acoustic dispersion (e.g., a high-quality acoustic dispersion) or a poor acoustic dispersion (e.g., a low-quality acoustic dispersion) based on comparing the acoustic dispersion to the dispersion evaluation benchmark 360. For example, the DQM 100 may characterize the first slowness-frequency dispersion 300 as a clean dispersion based on comparing the first frequency continuity band 320 and/or the first slowness projection band 330 to the dispersion evaluation benchmark 360. In another example, the DQM 100 may characterize the second slowness-frequency dispersion 310 as a poor dispersion based on comparing the second frequency continuity band 340 and/or the second slowness projection band 350 to the dispersion evaluation benchmark 360.

Figure 4:
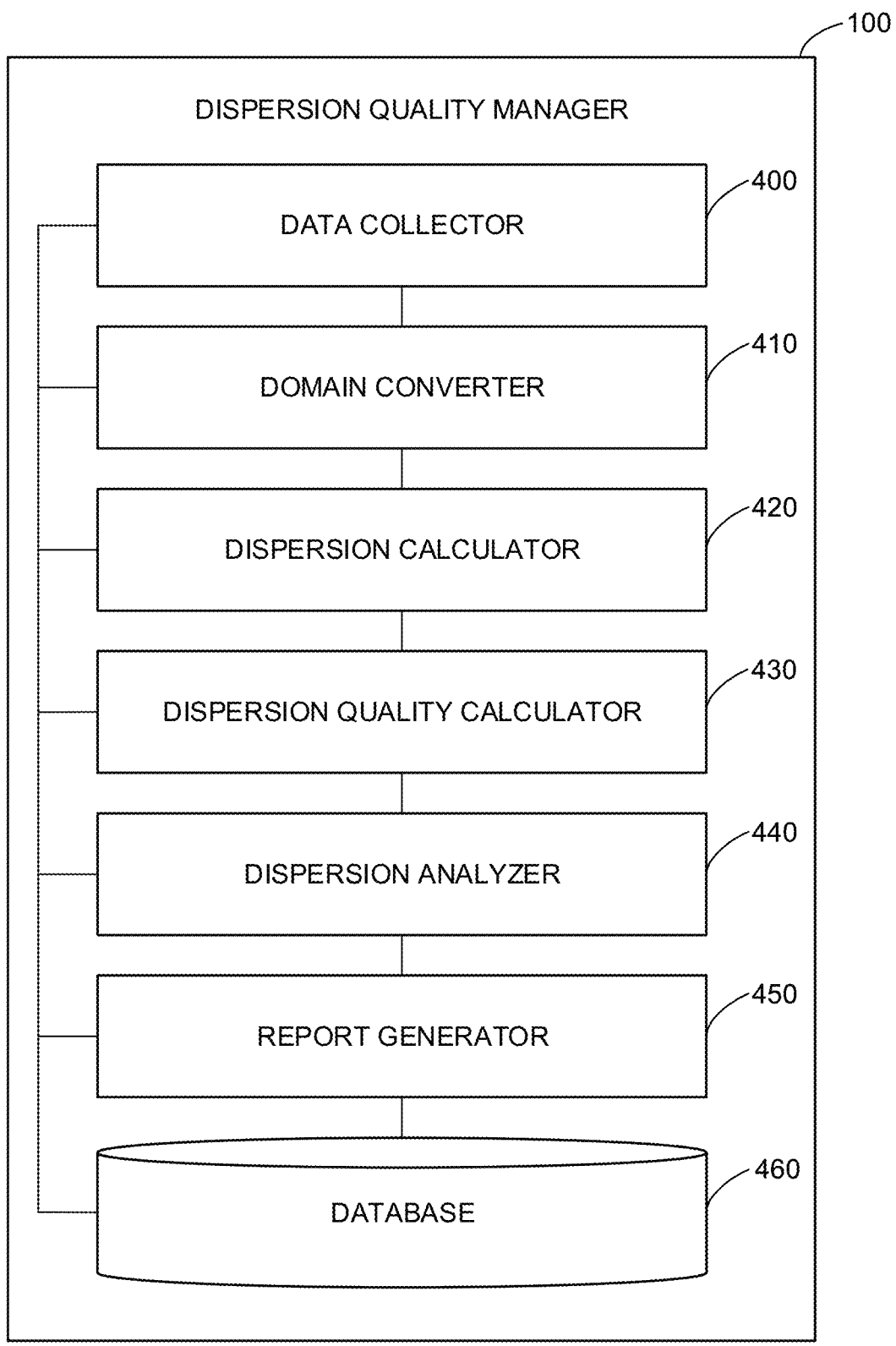
FIG. 4 is a block diagram of an example implementation of the example dispersion quality manager apparatus of FIG. 1.

FIG. 4 is a block diagram of an example implementation of the example DQM 100 of FIG. 1. In some examples, the DQM 100 converts an acoustic waveform corresponding to an acoustic dispersion in the time domain into a slowness-frequency dispersion in the frequency domain. In some examples, the DQM 100 characterizes the slowness-frequency dispersions and generates a recommendation corresponding to forecast wellbore operations based on the characterizations. In the illustrated example of FIG. 4, the DQM 100 includes an example data collector 400, an example domain converter 410, an example dispersion calculator 420, an example dispersion quality calculator 430, an example dispersion analyzer 440, an example report generator 450, and an example database 460.

In the illustrated example of FIG. 4, the DQM 100 includes the data collector 400 to obtain information acquired by the logging tool 102 of FIG. 1. For example, the data collector 400 may obtain the acoustic waveforms 210 included in the graph 200 of FIG. 2A. In some examples, the data collector 400 obtains data directly from the logging tool 102. In some examples, the data collector 400 determines when to obtain the data directly from the logging tool 102. In some examples, the data collector 400 determines whether to continue monitoring the logging tool 102. For example, the data collector 400 may determine that the logging tool 102 completed a wellbore monitoring operation.

In some examples, the data collector 400 obtains data from the logging tool 102 via the network 124 of FIG. 1. In some examples, the data collector 400 obtains information such as frequency data, velocity data, time-interval data, etc., and/or a combination thereof corresponding to a dispersion of an acoustic wave in a medium. For example, the data collector 400 may obtain time-interval data captured by the array of receivers 118 corresponding to the acoustic waves 120 of FIG. 1 propagating in the borehole 104 and/or the formation 106 of FIG. 1. In some examples, the data collector 400 stores information (e.g., obtained information acquired by the logging tool 102) in the database 460 and/or retrieves information from the database 460.

In the illustrated example of FIG. 4, the DQM 100 includes the domain converter 410 to convert data from a first domain to a second domain. In some examples, the domain converter 410 converts data in the time domain to the frequency domain. In some examples, the domain converter 410 converts data in the space domain (e.g., the time-space domain) to the wavenumber domain, which is equivalent to the slowness domain. For example, the domain converter 410 may convert the acoustic waveforms 210 of FIG. 2A to the slowness-frequency dispersions 230 of FIG. 2B. In some examples, the domain converter 410 converts data in the time domain to the frequency domain by using a modified matrix-pencil algorithm, a sparse-Bayesian learning algorithm, a two-dimensional (frequency-wavenumber) fast-Fourier transform, or any other type of data domain conversion algorithm or method. In some examples, the domain converter 410 stores information (e.g., converted acoustic waveforms, dispersion data, the slowness-frequency dispersions 230 of FIG. 2B, etc.) in the database 460 and/or retrieves information from the database 460.

In the illustrated example of FIG. 4, the DQM 100 includes the dispersion calculator 420 to generate an acoustic dispersion in response to converting time-domain data to frequency-domain data. In some examples, the dispersion calculator 420 selects a mode of interest to process. For example, the dispersion calculator 420 may select a Stoneley mode, a leaky-P mode, a pseudo-Rayleigh mode, a dipole mode, etc., to process. In some examples, the dispersion calculator 420 selects a depth of a borehole to process. For example, the dispersion calculator 420 may select a depth of 1000 feet (FT) corresponding to a depth of the borehole 104 of FIG. 1 to process acoustic information. For example, the dispersion calculator 420 may generate dispersion data (e.g., slowness data as a function of frequency data) for the Stoneley mode at 1000 FT. In some examples, the dispersion calculator 420 determines whether to select another depth of interest to process. For example, the dispersion calculator 420 may determine that there are one or more unprocessed depths based on the obtained and/or processed acoustic information.

In some examples, the dispersion calculator 420 calculates dispersion data for a selected mode. In some examples, the dispersion calculator 420 calculates slowness projection data. For example, the dispersion calculator 420 may calculate first dispersion data corresponding to a first acoustic log track 705 of FIG. 7. The first acoustic log track 705 of the illustrated example of FIG. 7 includes slowness data as a function of depth for the Stoneley mode. For example, the dispersion calculator 420 may generate the first acoustic log track 705 by projecting data included in the converted time-domain waveforms onto the slowness and the frequency axes.

In some examples, the dispersion calculator 420 calculates an inverse of the slowness variation width in response to calculating slowness projection data. For example, the dispersion calculator 420 may calculate second dispersion data corresponding to a second acoustic log track 710 of FIG. 7. The second acoustic log track 710 of the illustrated example of FIG. 7 includes an inverse of the slowness variation width as a function of depth for the Stoneley mode. For example, the dispersion calculator 420 may generate the second acoustic log track 710 by calculating an inverse of the dispersion data included in the first acoustic log track 705.

In some examples, the dispersion calculator 420 calculates frequency continuity data in response to calculating slowness data continuity as a function of frequency. For example, the dispersion calculator 420 may calculate frequency continuity data corresponding to a third acoustic log track 715 of FIG. 7. The third acoustic log track 715 of the illustrated example of FIG. 7 includes frequency data as a function of depth for the Stoneley mode. For example, the dispersion calculator 420 may generate the third acoustic log track 715 by evaluating data included in the converted time-domain waveforms as a function of frequency.

In some examples, the dispersion calculator 420 scales the slowness projection data, the inverse of the slowness variation width, the frequency continuity data, etc., and/or a combination thereof to values in a range of 0.0 to 1.0. Alternatively, the example dispersion calculator 420 may scale the data to values in any other range. In some examples, the dispersion analyzer 440 characterizes an acoustic dispersion by comparing the scaled values to the dispersion evaluation benchmark 360 of FIG. 3. In some examples, the dispersion calculator 420 stores information (e.g., the slowness projection data, the inverse of the slowness variation width data, the frequency continuity data, scaled data, etc.) in the database 460 and/or retrieves information from the database 460.

In the illustrated example of FIG. 4, the DQM 100 includes the dispersion quality calculator 430 to calculate a dispersion quality indicator (DQI) for an acoustic dispersion at a depth of the formation 106 of FIG. 1 based on calculated dispersion data. In some examples, the dispersion quality calculator 430 calculates a DQI value in a range of 0.0 to 1.0. Alternatively, the example dispersion quality calculator 430 may calculate a DQI value in any other range. In some examples, the dispersion quality calculator 430 calculates the DQI based on the inverse of the slowness variation width and the frequency continuity data. For example, the dispersion quality calculator 430 may calculate a DQI corresponding to a depth of the formation 106 by multiplying (1) a first data point included in the inverse of the slowness variation width (e.g., an inverse of the slowness variation width data value) at the depth and (2) a second data point included in the frequency continuity data (e.g., a frequency data value) at the depth. In such an example, the first and the second data points may be scaled to values in a range of 0.0 to 1.0 prior to calculating the DQI. Alternatively, the first and the second data points may be scaled to values in any other range.

In some examples, the dispersion quality calculator 430 calculates the DQI based on scaling data included in the inverse of the slowness variation width and the frequency continuity data. In such examples, the dispersion quality calculator 430 scales the data to increase or decrease an effect or an impact of the inverse of the slowness variation width and the frequency continuity data on the DQI. For example, the dispersion quality calculator 430 may calculate a DQI corresponding to a depth of the formation 106 by multiplying (1) a first data point included in the inverse of the slowness variation width at the depth scaled by a first factor (e.g., a first scaling factor, a first weight factor, a first weighting factor, etc.) and (2) a second data point included in the frequency continuity data at the depth scaled by a second factor (e.g., a second scaling factor, a second weight factor, a second weighting factor, etc.). For example, the dispersion quality calculator 430 may use 0.8 as the first factor and 0.2 as the second factor. In such an example, the first data point has a greater impact on the DQI value compared to the second data point. In some examples, the dispersion quality calculator 430 stores information (e.g., a calculated DQI) in the database 460 and/or retrieves information from the database 460.

In the illustrated example of FIG. 4, the DQM 100 includes the dispersion analyzer 440 to analyze a quality of an acoustic dispersion. In some examples, the dispersion analyzer 440 characterizes, identifies, etc., an acoustic dispersion as a high-quality acoustic dispersion (e.g., a clean acoustic dispersion), a low-quality acoustic dispersion (e.g., a poor acoustic dispersion, a distorted acoustic dispersion, etc.), etc. In some examples, the dispersion analyzer 440 characterizes an acoustic dispersion based on the dispersion data. For example, the dispersion analyzer 440 may compare a scaled value of a data point included in the slowness projection data (e.g., the first acoustic log track 705 of FIG. 7) at a depth to the dispersion evaluation benchmark 360. For example, the dispersion analyzer 440 may characterize the slowness projection at the depth as a narrow slowness projection indicating that the acoustic dispersion at the depth may correspond to a high-quality acoustic dispersion. In another example, the dispersion analyzer 440 may compare a scaled value of a data point included in the frequency continuity data (e.g., the third acoustic log track 715 of FIG. 7) at a depth to the dispersion evaluation benchmark 360. For example, the dispersion analyzer 440 may characterize the frequency continuity at the depth as a small continuity along the frequency axis indicating that the acoustic dispersion at the depth may correspond to a low-quality acoustic dispersion.

In some examples, the dispersion analyzer 440 characterizes an acoustic dispersion based on the DQI. For example, the dispersion analyzer 440 may characterize an acoustic dispersion at a depth of the formation 106 with a DQI value of 0.8 as a high-quality acoustic dispersion. In another example, the dispersion analyzer 440 may characterize an acoustic dispersion at a depth of the formation 106 with a DQI value of 0.2 as a low-quality acoustic dispersion. For example, a high DQI value (e.g., a DQI value of 0.6, 0.7, 0.8, etc.) may correspond to a stable wellbore or a stiff formation region. In another example, a low DQI value (e.g., a DQI value of 0.1, 0.2, 0.3, etc.) may correspond to a damaged zone of the formation 106, an over-pressured zone of the formation 106, a plastically yielded zone of the formation 106, etc. In yet another example, a low DQI value may correspond to a depth of the formation 106 that includes a geo-mechanical failure such as a breakout or a washout.

In some examples, the dispersion analyzer 440 generates one or more wellbore operation recommendations in response to characterizing one or more acoustic dispersions for one or more depths of the formation 106 of FIG. 1. For example, the dispersion analyzer 440 may generate a recommendation to exclude a damaged zone (e.g., a depth of the formation 106 having a low DQI) for an operation such as setting a packer, performing a hydraulic fracturing operation, etc., in response to characterizing the zone as damaged based on analyzing the DQI and/or corresponding dispersion data. In another example, the dispersion analyzer 440 may generate a recommendation to perform or proceed with a wellbore operation (e.g., a recommendation to pursue a performance of a hydraulic fracturing operation, setting a packer, or any other borehole operation, etc.) at one or more depths of the formation 106 in response to characterizing the one or more depths as a stable wellbore, a safe drilling zone, a rigid or a stiff formation zone, etc., based on analyzing the DQI and/or corresponding dispersion data.

In some examples, the dispersion analyzer 440 validates acoustic data based on the DQI and/or corresponding dispersion data. For example, the dispersion analyzer 440 may perform quality control of an acoustic log by calculating and analyzing a DQI for one or more depths of the formation 106. For example, the dispersion analyzer 440 may analyze the DQI and determine whether tool eccentering, borehole washout, etc., affected measurements obtained by the logging tool 102 of FIG. 1. For example, the dispersion analyzer 440 may determine that an increasing value of a DQI results in a higher probability that the acoustic log is substantially accurate (e.g., accurate within a tolerance). In another example, the dispersion analyzer 440 may perform quality control of cased-hole measurements. For example, cased-hole measurements are typically highly sensitive and, as a result, acoustic dispersions are typically highly sensitive to a condition of cement surrounding the borehole 104 of FIG. 1. In such an example, the dispersion analyzer 440 may validate the cased-hole product (e.g., represented by data in a cement bond log) by analyzing the DQI and determine that an increasing value of a DQI corresponds to an increased confidence in the cased-hole product.

In some examples, the dispersion analyzer 440 compares a DQI and/or corresponding dispersion data to a threshold and generates a recommendation in response to determining whether the comparison satisfies the threshold. For example, the dispersion analyzer 440 may compare a data point included in the slowness projection data, the inverse of the slowness variation width, the frequency continuity data, etc., to a dispersion value threshold. In such an example, the dispersion analyzer 440 may determine that the data point satisfies the dispersion value threshold by determining that the value of the data point is greater than the dispersion value threshold (or in some examples less than the dispersion value threshold). In another example, the dispersion analyzer 440 may compare a DQI corresponding to a depth of the formation 106 of FIG. 1 to a DQI threshold. In such an example, the dispersion analyzer 440 may determine that the DQI satisfies the DQI threshold by determining that the DQI is greater than the DQI threshold (or in some examples less than the DQI threshold). In some examples, the dispersion analyzer 440 stores information (e.g., an acoustic dispersion characterization, a wellbore operation recommendation, etc.) in the database 460 and/or retrieves information from the database 460.

In the illustrated example of FIG. 4, the DQM 100 includes the report generator 450 to generate and/or prepare reports. In some examples, the report generator 450 generates a report including one or more recommendations generated by the dispersion analyzer 440. In some examples, the report generator 450 generates a report including dispersion data. For example, the dispersion analyzer 440 may generate a report including slowness projection data, inverse of the slowness variation width, frequency continuity data, dispersion quality indicator data, etc., and/or a combination thereof. For example, the dispersion analyzer 440 may generate a report including one or more of the first through fifth curves 700, 705, 710, 715, 720 of FIG. 7. In some examples, the report generator 450 generates an alert such as displaying an alert on a user interface, propagating an alert message throughout a process control network, generating an alert log and/or an alert report, etc. For example, the report generator 450 may generate an alert corresponding to a characterization of an acoustic dispersion at a depth of the formation 106 based on whether the dispersion analyzer 440 determines that a DQI and/or corresponding dispersion data satisfies one or more thresholds. In some examples, the report generator 450 stores information (e.g., a report, an alert, etc.) in the database 460 and/or retrieves information from the database 460.

In the illustrated example of FIG. 4, the DQM 100 includes the database 460 to record data (e.g., acoustic data, dispersion data, acoustic dispersion characterizations, DQI, etc.). The example database 460 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 460 may additionally or alternatively be implemented by one or more double data rate (DDR) memories, such as DDR, DDR2, DDR3, mobile DDR (mDDR), etc. The example database 460 may additionally or alternatively be implemented by one or more mass storage devices such as hard disk drive(s), compact disk drive(s) digital versatile disk drive(s), etc. While in the illustrated example the database 460 is illustrated as a single database, the database 460 may be implemented by any number and/or type(s) of databases. Furthermore, the data stored in the database 460 may be in any data format such as, for example, binary data, comma delimited data, tab delimited data, structured query language (SQL) structures, etc.

While an example manner of implementing the DQM 100 of FIG. 1 is illustrated in FIG. 4, one or more of the elements, processes and/or devices illustrated in FIG. 4 may be combined, divided, re-arranged, omitted, eliminated, and/or implemented in any other way. Further, the example data collector 400, the example domain converter 410, the example dispersion calculator 420, the example dispersion quality calculator 430, the example dispersion analyzer 440, the example report generator 450, the example database 460, and/or, more generally, the example DQM 100 of FIG. 1 may be implemented by hardware, software, firmware and/or any combination of hardware, software and/or firmware. Thus, for example, any of the example data collector 400, the example domain converter 410, the example dispersion calculator 420, the example dispersion quality calculator 430, the example dispersion analyzer 440, the example report generator 450, the example database 460, and/or, more generally, the example DQM 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collector 400, the example domain converter 410, the example dispersion calculator 420, the example dispersion quality calculator 430, the example dispersion analyzer 440, the example report generator 450, and/or the example database 460 is/are hereby expressly defined to include a non-transitory computer readable storage device or storage disk such as a memory, a digital versatile disk (DVD), a compact disk (CD), a Blu-ray disk, etc. including the software and/or firmware. Further still, the example DQM 100 of FIG. 1 may include one or more elements, processes and/or devices in addition to, or instead of, those illustrated in FIG. 4, and/or may include more than one of any or all of the illustrated elements, processes, and devices.

Figure 5:
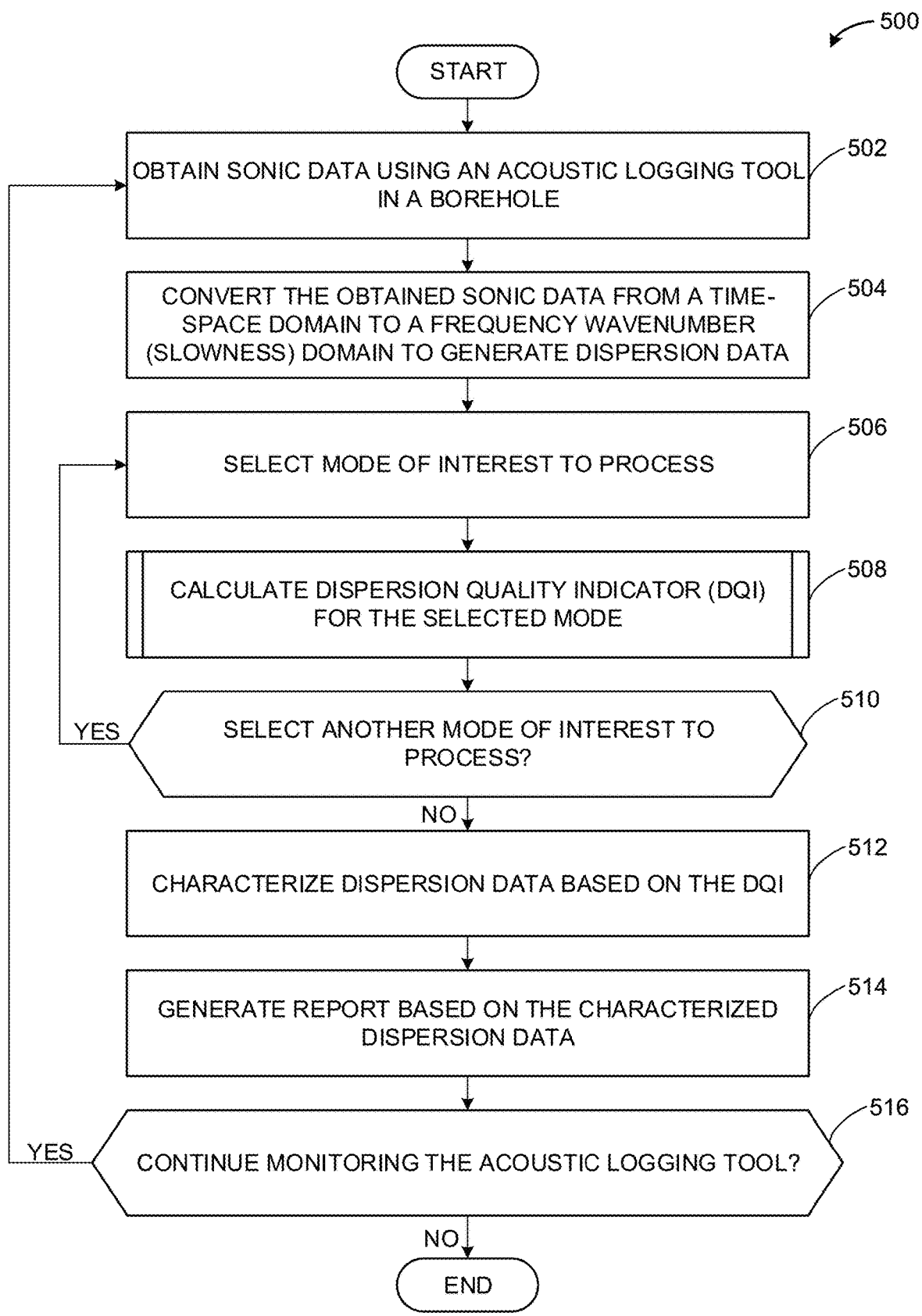
FIG. 5 is a flowchart representative of an example method that may be executed by the example dispersion quality manager apparatus of FIGS. 1 and 4 to characterize dispersion waveforms in a borehole.
Figure 6:
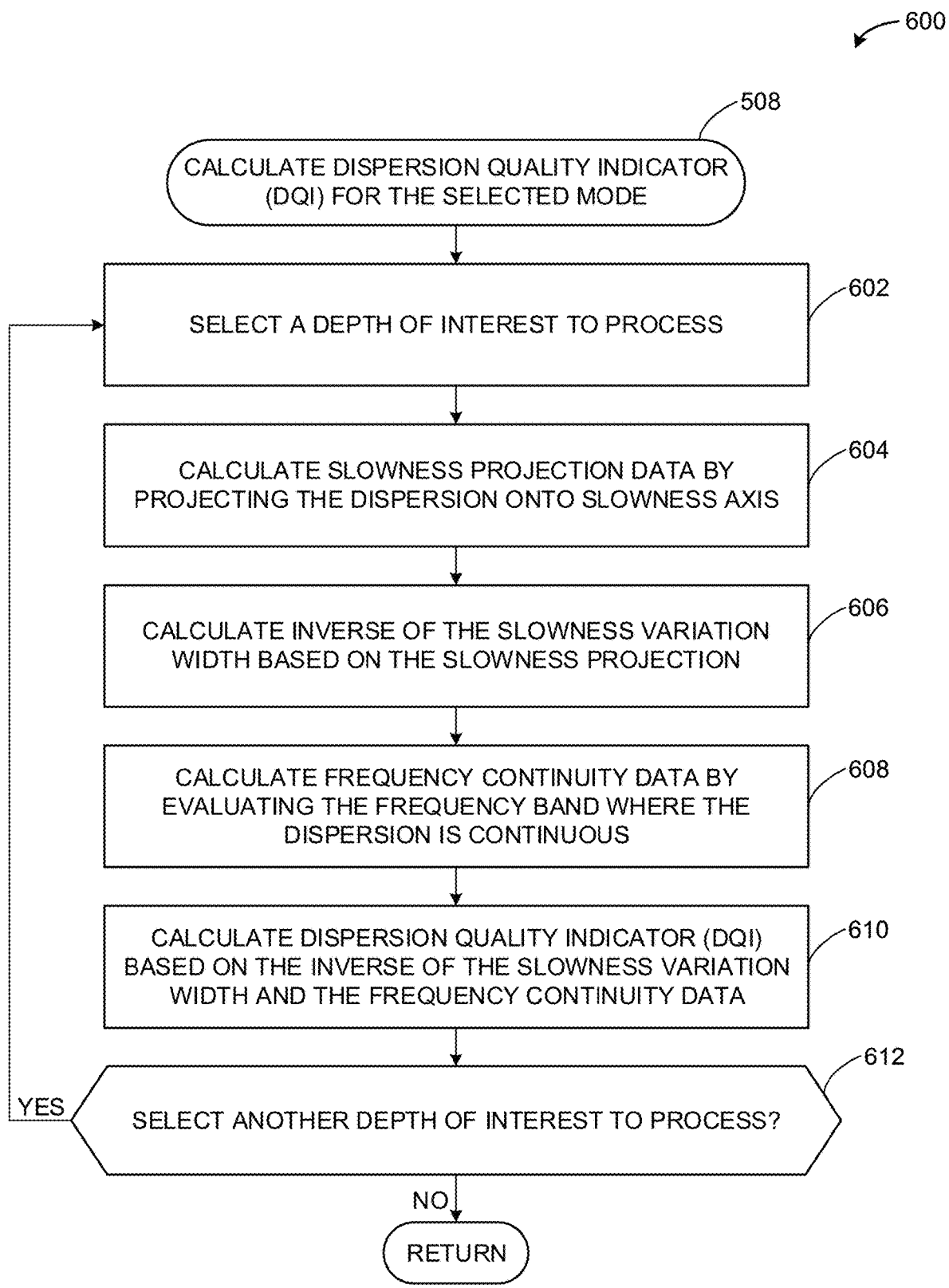
FIG. 6 is a flowchart representative of an example method that may be executed by the example dispersion quality manager apparatus of FIGS. 1 and 4 to calculate a dispersion quality indicator for a selected mode.

Flowcharts representative of example methods for implementing the example DQM 100 of FIGS. 1 and 4 are shown in FIGS. 5-6. In these examples, the methods may be implemented using machine readable instructions to comprise a program for execution by a processor such as a processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5-6, many other methods of implementing the example DQM 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-6 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

FIG. 5 is a flowchart representative of an example method 500 that may be performed by the example DQM 100 of FIGS. 1 and 4 to characterize dispersion waveforms corresponding to the acoustic waves 120 in the borehole 104 of the formation 106 of FIG. 1. The example method 500 begins at block 502 when the example DQM 100 obtains sonic data using an acoustic logging tool in a borehole. For example, the data collector 400 of FIG. 4 may obtain acoustic data corresponding to the acoustic waves 120 of FIG. 1 using the logging tool 102 in the borehole 104 of FIG. 1.

At block 504, the example DQM 100 converts the obtained sonic data from a time-space domain to a frequency wavenumber (slowness) domain to generate dispersion data. For example, the domain converter 410 of FIG. 4 may generate the slowness-frequency dispersions 230 of FIG. 2B by applying a modified matrix-pencil algorithm on the acoustic waveforms 210 of FIG. 2A.

At block 506, the example DQM 100 selects a mode of interest to process. For example, the dispersion calculator 420 of FIG. 4 may select the Stoneley mode to process. At block 508, the example DQM 100 calculates a dispersion quality indicator (DQI) for the selected mode. For example, the dispersion quality calculator 430 of FIG. 4 may calculate a DQI for the Stoneley mode corresponding to the acoustic waves 120 of FIG. 1 at a depth of the formation 106 of FIG. 1. An example process that can be used to implement block 508 is described below in connection with FIG. 6.

At block 510, the example DQM 100 determines whether to select another mode of interest to process. For example, the dispersion calculator 420 may select the lowest-order flexural borehole mode to process. If, at block 510, the example DQM 100 determines to select another mode of interest to process, control returns to block 506 to select another mode of interest to process.

If, at block 510, the example DQM 100 determines not to select another mode of interest to process, then, at block 512, the example DQM 100 characterizes the dispersion data based on the DQI. For example, the dispersion analyzer 440 of FIG. 4 may characterize an acoustic dispersion corresponding to the acoustic waves 120 of FIG. 1 as a high-quality acoustic dispersion based on the DQI calculated by the dispersion quality calculator 430.

At block 514, the example DQM 100 generates a report based on the characterized dispersion data. For example, the report generator 450 of FIG. 4 may generate a report including a recommendation to perform a wellbore operation at a depth of the formation 106 such as setting a packer at the depth based on the dispersion analyzer 440 characterizing the acoustic dispersions at the depth as a rigid formation zone of the formation 106.

At block 516, the example DQM 100 determines whether to continue monitoring the acoustic logging tool. For example, the data collector 400 may determine to stop monitoring the logging tool 102 of FIG. 1 in response to determining that the logging tool 102 completed a wellbore monitoring operation. If, at block 516, the example DQM 100 determines to continue monitoring the acoustic logging tool, control returns to block 502, otherwise the example method 500 concludes.

FIG. 6 is a flowchart representative of an example method 600 that may be performed by the example DQM 100 of FIGS. 1 and 4 to calculate a dispersion quality indicator (DQI) for the selected mode. The example process of FIG. 6 can be used to implement the operation of block 508 of FIG. 5.

The example method 600 begins at block 602 when the example DQM 100 selects a depth of interest to process. For example, the dispersion calculator 420 of FIG. 4 may select a depth of 1100 FT of the borehole 104 to process. For example, the dispersion calculator 420 may select a depth of interest corresponding to the acoustic data included in the acoustic waveforms 210 of FIG. 2A.

At block 604, the example DQM 100 calculates slowness projection data by projecting the dispersion onto a slowness axis. For example, the dispersion calculator 420 may generate the first acoustic log track 705 of FIG. 7 by projecting the dispersion data generated at block 504 of FIG. 5 onto the slowness axis. For example, the dispersion calculator 420 may generate the first dispersion data corresponding to the first acoustic log track 705 by mapping the slowness data (e.g., the slowness data corresponding to the acoustic data included in the acoustic waveform) as a function of depth of the borehole 104 in the formation 106 of FIG. 1.

At block 606, the example DQM 100 calculates inverse of the slowness variation width based on the slowness projection. For example, the dispersion calculator 420 may generate the second acoustic log track 710 of FIG. 7 by calculating an inverse of the first acoustic log track 705. For example, the dispersion calculator 420 may generate the second dispersion data corresponding to the second acoustic log track 710 by calculating an inverse of the first acoustic log track data and mapping the inverted first dispersion data as a function of depth of the borehole 104 in the formation 106 of FIG. 1.

At block 608, the example DQM 100 calculates frequency continuity data by evaluating the frequency band where the dispersion is continuous. For example, the dispersion calculator 420 may calculate the frequency continuity data by evaluating the slowness dispersion continuity as a function of frequency. For example, the dispersion calculator 420 may generate the third acoustic log track 715 of FIG. 7 by projecting the dispersion data generated at block 504 of FIG. 5 onto the frequency axis. For example, the dispersion calculator 420 may generate the third dispersion data corresponding to the third acoustic log track 715 by mapping the frequency data (e.g., the frequency data corresponding to the acoustic data included in the acoustic waveforms 210 of FIG. 2A) as a function of depth of the borehole 104 in the formation 106 of FIG. 1.

At block 610, the example DQM 100 calculates a dispersion quality indicator (DQI) based on the inverse of the slowness variation width and the frequency continuity data. For example, the dispersion quality calculator 430 of FIG. 4 may calculate a DQI at the selected depth of X100 FT by multiplying (1) a first data point included in the inverse of the slowness variation width corresponding to the second acoustic log track 710 of FIG. 7 at X100 FT and (2) a second data point included in the frequency continuity data corresponding to the third acoustic log track 715 of FIG. 7 at X100 FT.

At block 612, the example DQM 100 determines whether to select another depth of interest to process. For example, the dispersion calculator 420 may determine that there are additional depths to process. For example, the dispersion calculator 420 may determine that the depths of X150 FT, X200 FT, etc., corresponding to the acoustic waveforms have not been processed. If, at block 612, the example DQM determines to select another depth of interest to process, control returns to block 602 to select another depth of interest to process, otherwise the example method 600 concludes.

Figure 7:
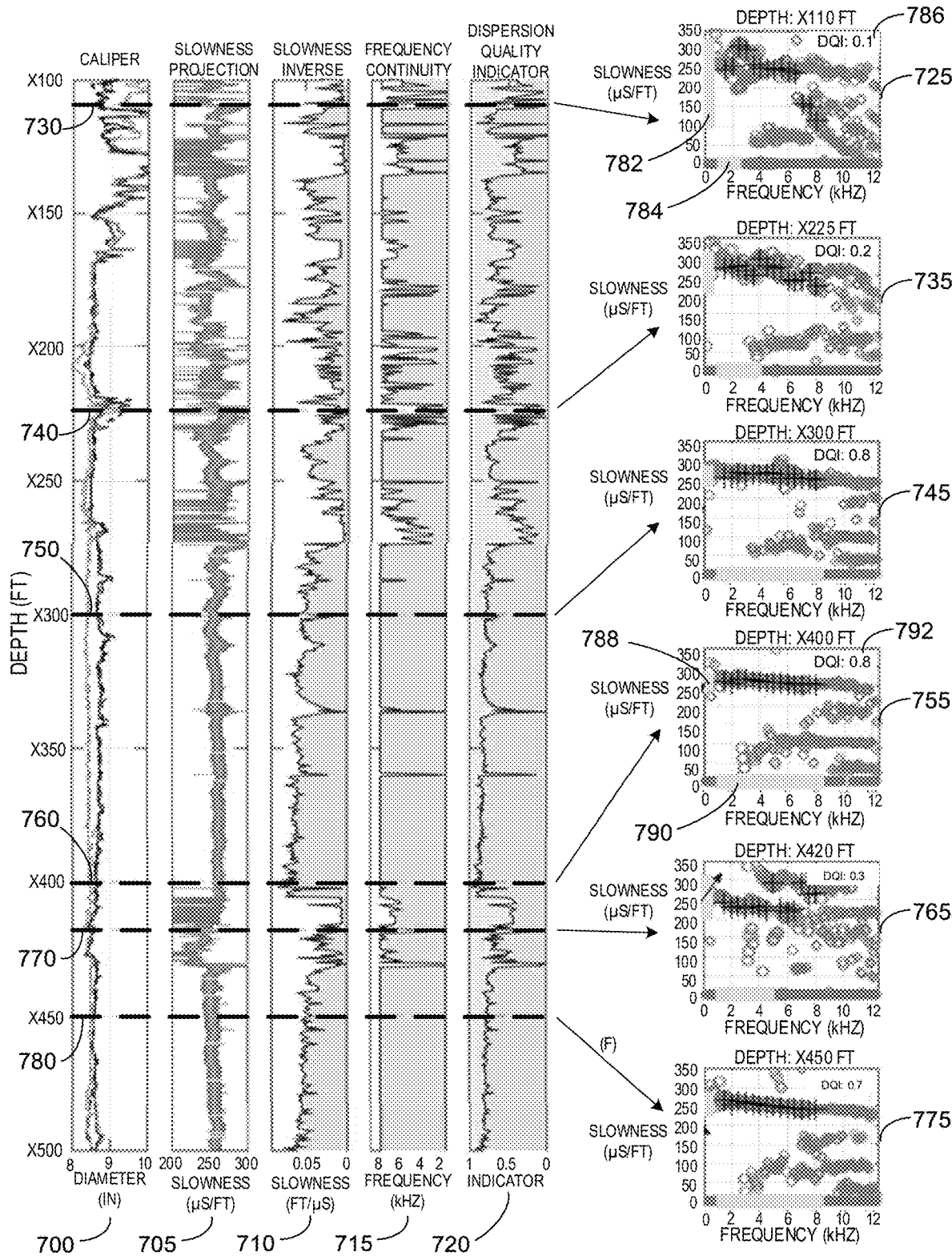
FIG. 7 depicts schematic illustrations of example graphs depicting obtained and/or processed acoustic data used to characterize example dispersion waveforms corresponding to an example borehole in an example formation.

FIG. 7 depicts schematic illustrations of example graphs depicting obtained and/or processed acoustic data used to characterize example dispersion waveforms corresponding to an example borehole in an example formation. In the illustrated example of FIG. 7, the caliper log 700 includes wellbore diameter data as a function of wellbore depth. In the illustrated example of FIG. 7, the first acoustic log track 705 corresponds to a slowness projection curve based on (1) converting the acoustic data included in an acoustic waveform (e.g., the acoustic waveforms 210 of FIG. 2A) from the time-space domain to the wavenumber (slowness) domain and (2) projecting the slowness data in the converted data onto the slowness axis as a function of wellbore depth.

In the illustrated example of FIG. 7, the second acoustic log track 710 corresponds to a slowness inverse curve based on (1) calculating an inverse of the slowness data included in the first acoustic log track 705 and (2) projecting the inverted data to the slowness axis as a function of wellbore depth. In the illustrated example of FIG. 7, the third acoustic log track 715 corresponds to a frequency continuity curve based on (1) converting the acoustic data included in the acoustic waveform from the time-space domain to the frequency domain and (2) evaluating the frequency band where the slowness dispersion curve is continuous as a function of wellbore depth.

In the illustrated example of FIG. 7, a dispersion quality indicator curve 720 corresponds to a DQI as a function of wellbore depth. For example, the dispersion quality calculator 430 may calculate a DQI at a depth based on the slowness projection data, the inverse of the slowness variation width, the frequency continuity data, etc., and/or a combination thereof for a plurality of depths.

In the illustrated example of FIG. 7, the dispersion calculator 420 generates a first through a sixth slowness-frequency dispersion curves 725, 735, 745, 755, 765, 775 to characterize acoustic dispersions at a first through a sixth depth (e.g., wellbore depth) 730, 740, 750, 760, 770, 780 of interest. Alternatively, the example dispersion calculator 420 may generate fewer or more than the quantity of slowness-frequency dispersion curves depicted in FIG. 7. Alternatively, the example dispersion calculator 420 may generate slowness-frequency dispersion curves for fewer or more than the quantity of wellbore depths depicted in FIG. 7. In the illustrated example, the first through the sixth slowness-frequency dispersion curves 725, 735, 745, 755, 765, 775 include data as a function of frequency and slowness. In the illustrated example, the first through the sixth slowness-frequency dispersion curves 725, 735, 745, 755, 765, 775 include characterizations of the slowness projection and the continuity along the frequency axis.

In the illustrated example of FIG. 7, the first slowness-frequency dispersion curve 725 is generated at the first depth 730 of X110 FT (e.g., 110 FT, 1110 FT, 2110 FT, etc.). In the illustrated example, the first slowness-frequency dispersion curve 725 includes a first slowness projection characterization 782. In the illustrated example, the first slowness projection characterization 782 represents data included in the first acoustic log track 705. In some examples, the dispersion analyzer 440 compares the first slowness projection characterization 782 to the dispersion evaluation benchmark 360 of FIG. 3 and determines that the first slowness projection characterization 782 maps to the wider end of the spectrum corresponding to the slowness projection component of the dispersion evaluation benchmark 360 based on the comparison. For example, the dispersion analyzer 440 may determine that the acoustic dispersion at the wellbore depth of X110 FT is a poor dispersion based on the comparison.

In the illustrated example of FIG. 7, the first slowness-frequency dispersion curve 725 includes a first frequency continuity characterization 784. In the illustrated example, the first frequency continuity characterization 784 represents data included in the third acoustic log track 715. In some examples, the dispersion analyzer 440 compares the first frequency continuity characterization 784 to the dispersion evaluation benchmark 360 of FIG. 3 and determines that the first frequency continuity characterization 784 maps to the shorter end of the spectrum corresponding to the continuity along the frequency axis component of the dispersion evaluation benchmark 360 based on the comparison. For example, the dispersion analyzer 440 may determine that the acoustic dispersion at the wellbore depth of X110 FT is a poor dispersion based on the comparison.

In the illustrated example of FIG. 7, the first slowness-frequency dispersion curve 725 includes a first DQI value 786 of 0.1. The example DQI value of 0.1 corresponds to the acoustic dispersion at the wellbore depth of 1110 FT being a poor dispersion. For example, the dispersion quality calculator 430 may calculate the first DQI value 786 of 0.1 by multiplying (1) a first data point at the first depth 730 included in the second acoustic log track 710 and (2) a second data point at the first depth 730 included in the third acoustic log track 715. For example, the dispersion quality calculator 430 may calculate a DQI value for a plurality of depths to generate the dispersion quality indicator curve 720 depicted in FIG. 7.

In the illustrated example of FIG. 7, the fourth slowness-frequency dispersion curve 755 is generated at the fourth depth 760 of X400 FT. In the illustrated example, the fourth slowness-frequency dispersion curve 755 includes a fourth slowness projection characterization 788. In the illustrated example, the fourth slowness projection characterization 788 represents data included in the first acoustic log track 705. In some examples, the dispersion analyzer 440 compares the fourth slowness projection characterization 788 to the dispersion evaluation benchmark 360 of FIG. 3 and determines that the fourth slowness projection characterization 788 maps to the narrower end of the spectrum corresponding to the slowness projection component of the dispersion evaluation benchmark 360 based on the comparison. For example, the dispersion analyzer 440 may determine that the acoustic dispersion at the wellbore depth of X400 FT is a clean dispersion based on the comparison.

In the illustrated example of FIG. 7, the first slowness-frequency dispersion curve 725 includes a fourth frequency continuity characterization 790. In the illustrated example, the fourth frequency continuity characterization 790 represents data included in the third acoustic log track 715. In some examples, the dispersion analyzer 440 compares the fourth frequency continuity characterization 790 to the dispersion evaluation benchmark 360 of FIG. 3 and determines that the fourth frequency continuity characterization 790 maps to the longer end of the spectrum corresponding to the continuity along the frequency axis component of the dispersion evaluation benchmark 360 based on the comparison. For example, the dispersion analyzer 440 may determine that the acoustic dispersion at the wellbore depth of X400 FT is a clean dispersion based on the comparison.

In the illustrated example of FIG. 7, the fourth slowness-frequency dispersion curve 755 includes a fourth DQI value 792 of 0.8. The example DQI value of 0.8 corresponds to the acoustic dispersion at the wellbore depth of X400 FT being a clean dispersion. For example, the dispersion quality calculator 430 may calculate the fourth DQI value 792 of 0.8 by multiplying (1) a first data point at the fourth depth 760 included in the second acoustic log track 71 and (2) a second data point at the fourth depth 760 included in the third acoustic log track 715.

In some examples, the report generator 450 of FIG. 4 generates a report including the acoustic waveforms 210 of FIG. 2A, the first acoustic log track 705, the second acoustic log track 710, the third acoustic log track 715, the dispersion quality indicator curve 720, etc., and/or a combination thereof. In such examples or other examples, the report generator 450 generates a report including one or more of the first through the sixth slowness-frequency dispersion curves 725, 735, 745, 755, 765, 775. In such examples or other examples, the report generator 450 generates a report including the first DQI value 786, the fourth DQI value 792, etc., and/or a combination thereof. In such examples or other examples, the report generator 450 generates a report including a recommendation determined by the dispersion analyzer 440 based on the one or more DQI values 786, 792.

Figure 8:
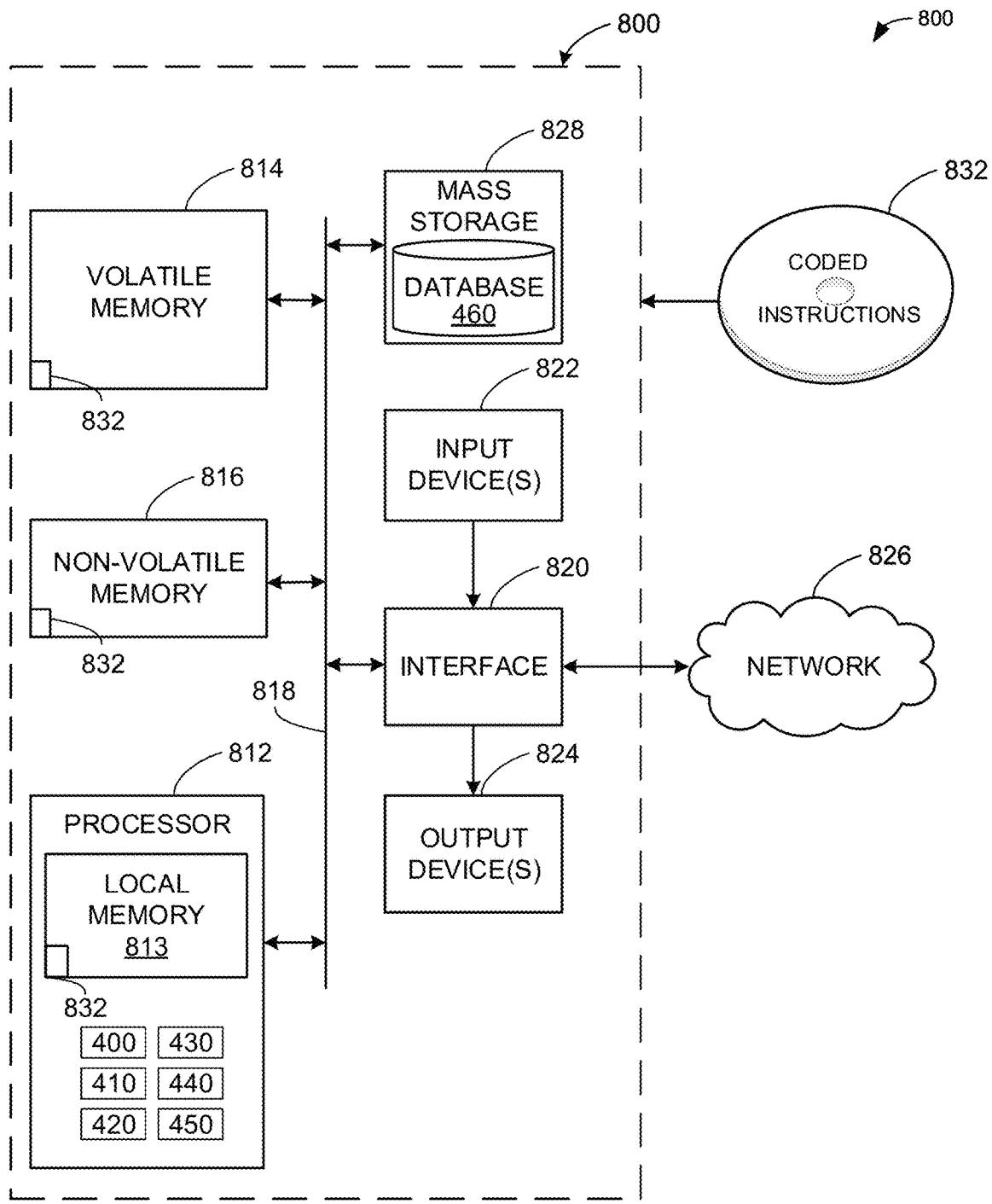
FIG. 8 is a block diagram of an example processing platform structured to execute machine readable instructions to implement the methods of FIGS. 5-6 and/or the example dispersion quality manager apparatus of FIGS. 1 and 4.

FIG. 8 is a block diagram of an example processor platform 800 capable of executing instructions to implement the methods of FIGS. 5-6 to implement the DQM 100 of FIGS. 1 and 4. The processor platform 800 can be, for example, a server, a personal computer such as a desktop computer or a laptop computer, a mobile device (e.g., a cell phone, a smart phone, a tablet such as an iPad'), a personal digital assistant (PDA), or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor 812 implements the example data collector 400, the example domain converter 410, the example dispersion calculator 420, the example dispersion quality calculator 430, the example dispersion analyzer 440, and the example report generator 450 of FIG. 4.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a peripheral component interconnect (PCI) express interface.

In the illustrated example, one or more input devices 822 are connected to the interface circuit 820. The input device(s) 822 permit(s) a user to enter data and/or commands into the processor 812. The input device(s) can be implemented by, for example, a keyboard, a button, a mouse, a touchscreen, a track-pad, a trackball, an isopoint device, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and DVD drives. The example mass storage device(s) 828 implement the example database 460 of FIG. 4.

Coded instructions 832 to implement the methods of FIGS. 5-6 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus, and articles of manufacture have been disclosed that characterize acoustic dispersions in a borehole. The above-disclosed DQM apparatus can analyze a dispersion curve without requiring an a priori model and can be applied to dispersive or non-dispersive acoustic waves acquired by monopole, dipole, quadrupole, unipole, or any other type of sonic and ultrasonic acoustic measurement method. The above-disclosed DQM apparatus can reduce computational processing requirements for analyzing acoustic dispersions by calculating a dispersion quality indicator for a reduced number of borehole depths compared to prior examples. The above-disclosed DQM apparatus can improve memory allocation efforts and reduce storage requirements by reducing a quantity of borehole depths to be analyzed to characterize a property of a formation. The above-disclosed DQM apparatus can be used for qualitative and quantitative analysis of potential borehole condition anomalies such as a presence of a borehole rugosity, washout, formation damage, plastic deformations, etc., that have plagued prior examples of acoustic dispersion analysis.

Although certain example methods, apparatus, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
an interface that receives acoustic data acquired by a borehole tool at one or more depths of a borehole in a formation;
a dispersion analyzer that analyzes the acoustic data to determine at least one dispersion indicator of slowness with respect to frequency, wherein the dispersion analyzer calculates at least one of the at least one dispersion indicator based on at least an inverse of a slowness variation width; and
a borehole condition anomaly detector that, based on the at least one of the at least one dispersion indicator, detects a borehole condition anomaly at at least one of the one or more depths of the borehole in the formation.

2. The apparatus of claim 1 wherein the borehole condition anomaly is a mechanical condition anomaly of the formation.

3. The apparatus of claim 1 wherein the borehole condition anomaly is a non-elastic rock condition anomaly of the formation.

4. The apparatus of claim 1 wherein the acoustic data comprise Stoneley wave data and wherein the borehole condition anomaly is a permeability condition anomaly of the formation.

5. The apparatus of claim 1, wherein the interface is operatively coupled to the borehole tool to receive the acoustic data at the one or more depths using an acoustic array included in the borehole tool.

6. The apparatus of claim 1, further including a domain converter to convert the acoustic data from a time domain to a frequency domain to generate dispersion data for slowness as a function of frequency.

7. The apparatus of claim 1, wherein the dispersion analyzer calculates the at least one of the at least one dispersion indicator based on at least the inverse of the slowness variation width and frequency continuity data.

8. The apparatus of claim 1, wherein the dispersion analyzer determines the inverse of the slowness variation width by calculating slowness data as a function of depth.

9. The apparatus of claim 7, wherein the dispersion analyzer determines the frequency continuity data by calculating slowness data in a frequency domain as a function of depth.

10. The apparatus of claim 1, wherein the dispersion analyzer determines the at least one of the at least one dispersion indicator at one of the one or more depths by multiplying a data value included in the inverse of the slowness variation width scaled by a first factor at the one of the one or more depths and a frequency data value scaled by a second factor at the one of the one or more depths, wherein the first factor differs from the second factor.

11. The apparatus of claim 1, comprising a controller that, based on the detected borehole condition anomaly, issues a control signal to perform at least one of a cementing operation, a hydraulic fracturing operation, or an installation of a packer.

12. A method comprising:
receiving acoustic data acquired by a borehole tool at one or more depths of a borehole in a formation;
analyzing the acoustic data to determine at least one dispersion indicator of slowness with respect to frequency, wherein the analyzing determines at least one of the at least one dispersion indicator based on at least an inverse of a slowness variation width; and
using the at least one of the at least one dispersion indicator, detecting a borehole condition anomaly at at least one of the one or more depths of the borehole in the formation.

13. The method of claim 12 wherein the borehole condition anomaly is a mechanical condition anomaly of the formation.

14. The method of claim 12 wherein the borehole condition anomaly is a non-elastic rock condition anomaly of the formation.

15. The method of claim 12, comprising conveying the borehole tool in the formation wherein the borehole tool obtains the acoustic data at each of the one or more depths using an acoustic array included in the borehole tool.

16. The method of claim 12, wherein the analyzing determines the at least one of the at least one dispersion indicator based on at least the inverse of the slowness variation width and frequency continuity data.

17. The method of claim 12, wherein the analyzing determines the inverse of the slowness variation width by calculating slowness data as a function of depth.

18. The method of claim 12, wherein the analyzing determines the at least one of the at least one dispersion indicator by multiplying a data value included in the inverse of the slowness variation width scaled by a first factor at one of the one or more depths and a frequency data value scaled by a second factor at the one of the one or more depths, wherein the first factor differs from the second factor.

19. The method of claim 12 comprising outputting a dispersion indicator log as a series of dispersion indicators versus depth wherein the series of dispersion indicators comprise the at least one dispersion indicator.

20. A non-transitory computer readable storage medium comprising instructions which, when executed, cause a machine to at least:
receive acoustic data acquired by a borehole tool at one or more depths of a borehole of a formation;
analyze the acoustic data to determine at least one dispersion indicator of slowness with respect to frequency wherein at least one of the at least one dispersion indicator is determined based on at least one of an inverse of a slowness variation width or frequency continuity data; and
use the at least one of the at least one dispersion indicator to detect a borehole condition anomaly at least one of the one or more depths of the borehole in the formation.

21. An apparatus comprising:
an interface that receives acoustic data acquired by a borehole tool at one or more depths of a borehole in a formation;
a dispersion analyzer that analyzes the acoustic data to determine at least one dispersion indicator of slowness with respect to frequency, wherein the dispersion analyzer calculates at least one of the at least one dispersion indicator based on at least frequency continuity data; and
a borehole condition anomaly detector that, based on the at least one of the at least one dispersion indicator, detects a borehole condition anomaly at at least one of the one or more depths of the borehole in the formation.

22. The apparatus of claim 21, wherein the dispersion analyzer determines the frequency continuity data by calculating slowness data in a frequency domain as a function of depth.

23. An apparatus comprising:
   an interface that receives acoustic data acquired by a borehole tool at one or more depths of a borehole in a formation;
   a dispersion analyzer that analyzes the acoustic data to determine at least one dispersion indicator of slowness with respect to frequency;
   a borehole condition anomaly detector that, based on at least one of the at least one dispersion indicator, detects a borehole condition anomaly at at least one of the one or more depths of the borehole in the formation; and
   a controller that, based on the detected borehole condition anomaly, issues a control signal to perform at least one of a cementing operation, a hydraulic fracturing operation, or an installation of a packer.

24. A method comprising:
   receiving acoustic data acquired by a borehole tool at one or more depths of a borehole in a formation;
   analyzing the acoustic data to determine at least one dispersion indicator of slowness with respect to frequency, wherein the analyzing determines at least one of the at least one dispersion indicator based on at least frequency continuity data; and
   using the at least one of the at least one dispersion indicator, detecting a borehole condition anomaly at at least one of the one or more depths of the borehole in the formation.

25. The method of claim 24, wherein the analyzing determines the frequency continuity data by calculating slowness data in a frequency domain as a function of depth.

26. A method comprising:
   receiving acoustic data acquired by a borehole tool at one or more depths in a borehole in a formation;
   analyzing the acoustic data to determine at least one dispersion indicator of slowness with respect to frequency;
   outputting a dispersion indicator log as a series of dispersion indicators versus depth wherein the dispersion indicators comprise the at least one dispersion indicator; and
   using the dispersion indicator log, detecting a borehole condition anomaly at at least one of the one or more depths of the borehole in the formation.

* * * * *